United States Patent
Yamane

(10) Patent No.: US 10,893,117 B2
(45) Date of Patent: Jan. 12, 2021

(54) ENABLING HIGH SPEED AND LOW POWER OPERATION OF A SENSOR NETWORK

(71) Applicant: INTERNATIONAL BUSINESS MACHINES CORPORATION, Armonk, NY (US)

(72) Inventor: Toshiyuki Yamane, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/201,115

(22) Filed: Nov. 27, 2018

(65) Prior Publication Data
US 2020/0169618 A1    May 28, 2020

(51) Int. Cl.
*H04L 29/08* (2006.01)
*G06F 1/28* (2006.01)

(52) U.S. Cl.
CPC ............ *H04L 67/2828* (2013.01); *G06F 1/28* (2013.01); *H04L 67/12* (2013.01)

(58) Field of Classification Search
CPC . H04L 67/2828; H04L 67/12; H04L 63/1425; H04L 67/10; H04L 69/04; H04L 67/1097; G06F 1/28; G06F 21/6245; G06N 99/005; G06N 3/04; G06N 20/00; H04W 84/18
See application file for complete search history.

(56) References Cited

U.S. PATENT DOCUMENTS

| 10,211,856 B1* | 2/2019 | Petre ...................... G06N 3/063 |
| 2014/0108094 A1* | 4/2014 | Beddo .................. G06Q 10/067 705/7.31 |
| 2016/0044439 A1* | 2/2016 | Mittal ............... H04W 52/0222 370/311 |

(Continued)

OTHER PUBLICATIONS

L. Appeltant, et al., "Information Processing Using a Single Dynamical Node as Complex System", Nature Communications 2:468, Sep. 13, 2011, pp. 1-26, Article No. 468, Macmillan Publishers Limited.

(Continued)

*Primary Examiner* — Muhammad Raza
(74) *Attorney, Agent, or Firm* — Tutunjian & Bitetto, P.C.; Randall Bluestone

(57) ABSTRACT

A system for enhancing speed and power operation of a sensor network is provided. The system includes an edge section disposed at an edge location and including a reservoir layer placed at the edge location. The reservoir layer has a set of reservoir nodes for performing edge computing by compressing time-series data by reducing a dimensionality of the time-series data using a random projection method. The compression of the time-series data reduces spatial redundancy and preserves a structure of the time-series data. The system further includes a datacenter section disposed at a datacenter location and including an output layer placed at the datacenter location. The output layer has a set of output nodes connected to the set of reservoir nodes for reconstructing the time-series data from the compressed time-series data, thereby enhancing speed and power operation of the sensor network.

6 Claims, 7 Drawing Sheets

(56) References Cited

U.S. PATENT DOCUMENTS

| | | | | |
|---|---|---|---|---|
| 2017/0142187 | A1* | 5/2017 | Pimentel | H04L 67/06 |
| 2017/0310691 | A1 | 10/2017 | Vasseur et al. | |
| 2018/0181878 | A1* | 6/2018 | Kasiviswanathan ... | G06N 20/00 |
| 2018/0338017 | A1* | 11/2018 | Mekuria | H04L 69/04 |

OTHER PUBLICATIONS

Qianlima, et al., "Deep-ESN: A Multiple Projection-encoding Hierarchical Reservoir Computing Framework", Journal of Latex Class Files, Aug. 2017, pp. 1-15, vol. 14, No. 8.

L.Lekamalage, et al., "Dimension Reduction With Extreme Learning Machine", IEEE Transactions on Image Processing, Aug. 2016, pp. 3906-3918, vol. 25, No. 8, IEEE.

B. Penkovsky, et al., "Efficient Design of Hardware-Enabled Recurrent Neural Networks", ArXiv.org, May 9, 2018, pp. 1-8, ArXiv.

L. Daubigney, et al., "Random Projections: A Remedy for Overfitting Issues in Time Series Prediction With Echo State Networks", 2013 IEEE International Conference on Acoustics, Speech and Signal Processing, Oct. 21, 2013, pp. 3253-3257, IEEE.

D. Hsu, "Time Series Compression Based on Adaptive Piecewise Recurrent Autoencoder", ArXiv.org, Jul. 26, 2017, pp. 1-8, ArXiv.

* cited by examiner

ENABLING HIGH SPEED AND LOW POWER OPERATION OF A SENSOR NETWORK

BACKGROUND

Technical Field

The present invention generally relates to reservoir computing, and more particularly to enabling high speed and lower power operation of a sensor network.

Description of the Related Art

A recent trend in the field of big data is data related to human cognition such as, e.g., voices, images, videos and texts. Illustratively, this data can be generated within a sensor network. Such data related to human cognition can be generated by edge devices associated with a sensor network system, which can be transmitted to one or more datacenters of the sensor network. As used herein, "edge devices" can refer to all sensors, equipment, mobile devices, cars, robots, etc. mutually interconnected and deployed around the world. One example of a sensor network is an Internet of Things (IoT) system. Edge devices can have different performance requirements than datacenters such as, e.g., power constraints, high speed and real-time operations.

SUMMARY

In accordance with an embodiment of the present invention, a system for enhancing speed and power operation of a sensor network is provided. The system includes an edge section disposed at an edge location and including a reservoir layer placed at the edge location. The reservoir layer has a set of reservoir nodes for performing edge computing by compressing time-series data by reducing a dimensionality of the time-series data using a random projection method. The compression of the time-series data reduces spatial redundancy and preserves a structure of the time-series data. The system further includes a datacenter section disposed at a datacenter location and including an output layer placed at the datacenter location. The output layer has a set of output nodes connected to the set of reservoir nodes for reconstructing the time-series data from the compressed time-series data, thereby enhancing speed and power operation of the sensor network.

In accordance with another embodiment of the present invention, a computer-implemented method for enhancing speed and power operation of a sensor network is provided. The method includes performing, by a reservoir layer having a set of reservoir nodes placed at an edge location of an edge section, edge computing, including compressing time-series data by reducing a dimensionality of the time-series data using a random projection method. The compression of the time-series data reduces spatial redundancy and preserves a structure of the time-series data. The method further includes transmitting, by the reservoir layer to an output layer having a set of output nodes placed at a datacenter location of a datacenter section, the compressed time-series for reconstructing the time-series data, thereby enhancing speed and power operation of the sensor network.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
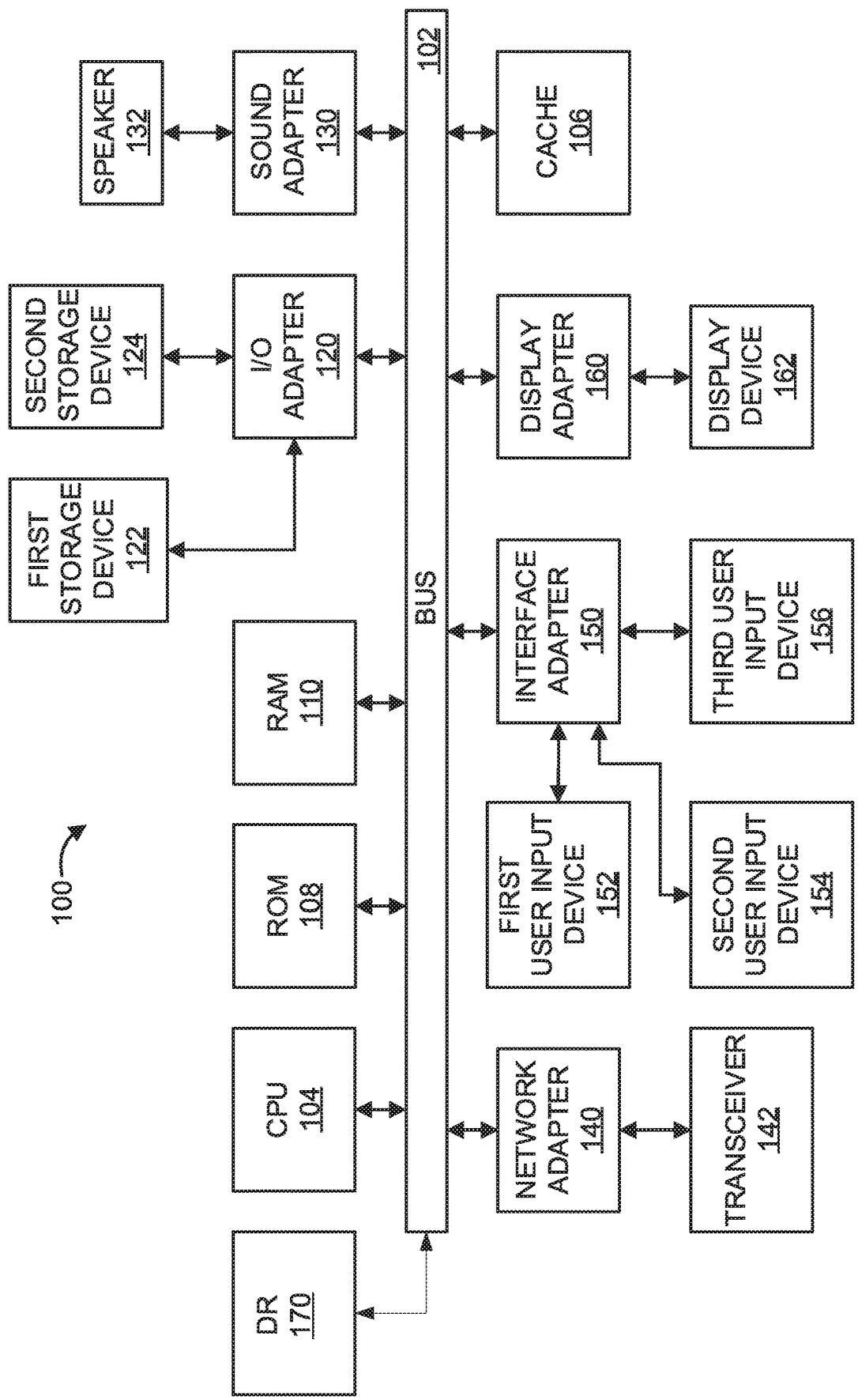
FIG. 1 is a block diagram of a processing system, in accordance with an embodiment of the present invention.

As the number of edge devices within a sensor network increases exponentially, it can become infeasible to apply a computing approach that transfers the data to datacenters and gives feedback to the sensor network based on analytics, since heavy network traffic, high power consumption and response latency can provide bottlenecks of the overall system. Moreover, if the edge devices are located close to each other, there can be significant correlations among the sensor data from the edge devices. Due to this, the sensor data can be spatially redundant, so that the "real" dimension of the sensor data can be relatively low and thus can have a latent low dimensionality.

To address at least the above-noted concerns relating to sensor networks, the embodiments described herein can enhance speed and power operation of a sensor network. For example, the embodiments described herein can enable high speed and lower power operation of a sensor network. To enhance speed and power operation of a sensor network, reservoir computing components can be placed at respective locations within a sensor network for performing edge computing to achieve increased system efficiency by moving computations close to data sources, instead of moving data to remote datacenters (e.g., cloud datacenters) for computation. Reservoir computing is a computational framework based on recurrent neural network (RNN) models (e.g., echo state networks and liquid state machines) that can be used to model dynamical systems.

More specifically, the embodiments described herein provide for an edge section of a sensor network and a datacenter section of the sensor network connected to the edge section via a network section (e.g., the Internet). The edge section is disposed at an edge location and includes a reservoir layer placed at the edge location, and the datacenter section is disposed at a datacenter location and includes an output (e.g., readout) layer placed at the datacenter location connected to the reservoir layer. The reservoir layer can map inputs to a higher-dimensional space (e.g., non-linearly), and the output layer can extract features of the inputs from the output generated by the reservoir layer. An internal connection matrix in the reservoir layer can be initialized randomly and left unchanged, such that the reservoir layer is fixed, while parameters of the output layer can be trained (e.g., using adaptive filters) so that the difference of the output and desired results is minimized. Therefore, using reservoir computing in accordance with the embodiments described herein can reduce cost of learning as compared to other neural network based systems (e.g., deep neural network based systems) that need hard optimization.

As will be described in further detail below with reference to FIGS. 4-6, the reservoir layer can receive time-series data (e.g., from an input layer), and can perform edge computing by compressing the time-series data by reducing a dimensionality of the time-series data using a random projection method. The compression can reduce spatial redundancy and preserve a structure of the time-series data. The output layer can reconstruct the time-series data from the compressed time-series data, thereby enhancing speed and power operation of the sensor network. Moreover, the reservoir layer can be software based, or can be embodied using a (non-linear) physical system or physical device. The physical implementation of the reservoir layer can achieve performance gains as compared to the software implementation of the reservoir layer, such as, e.g., real-time, higher speed and lower power operation. Accordingly, making use of the latent low dimensionality of input time-series data, the embodiments described herein can perform edge computing by compressing the input time-series data at an edge section of a sensor network before the input time-series data is sent to a datacenter section of the sensor network for processing, thereby enhancing speed and power operation of the sensor network (e.g., enabling high speed and lower power operation of the sensor network).

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Dimension reduction (DR) component 170 may be operatively coupled to system bus 102. DR component 170 is configured to perform one or more of the operations described below. For example, as will be described in further detail below, the DR component 170 can be implemented as part of a reservoir of a reservoir computing system. DR component 170 can be implemented as a standalone special purpose hardware device, or may be implemented as software stored on a storage device. In the embodiment in which DR component 170 is software-implemented, although DR component 170 is shown as a separate component of the computer system 100, DR component 170 can be stored on, e.g., the first storage device 122 and/or the second storage device 124. Alternatively, DR component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
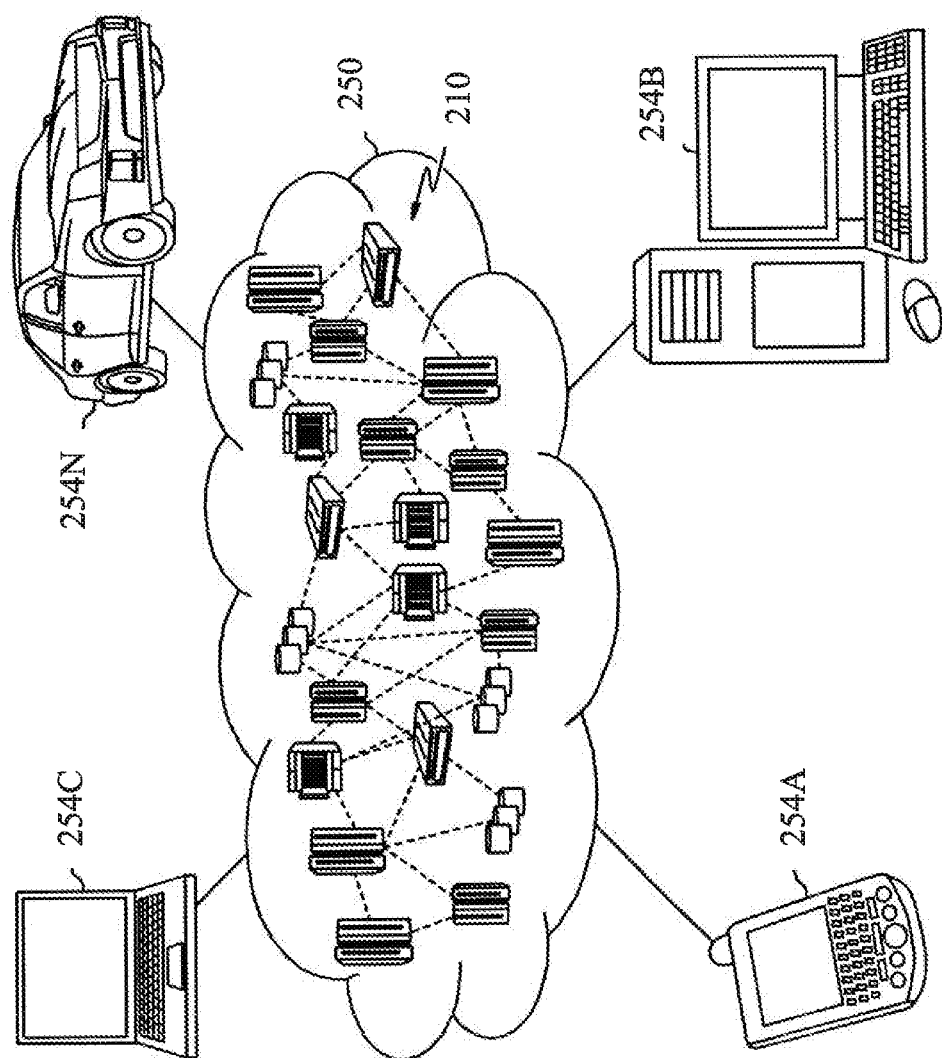
FIG. 2 is a block diagram of an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
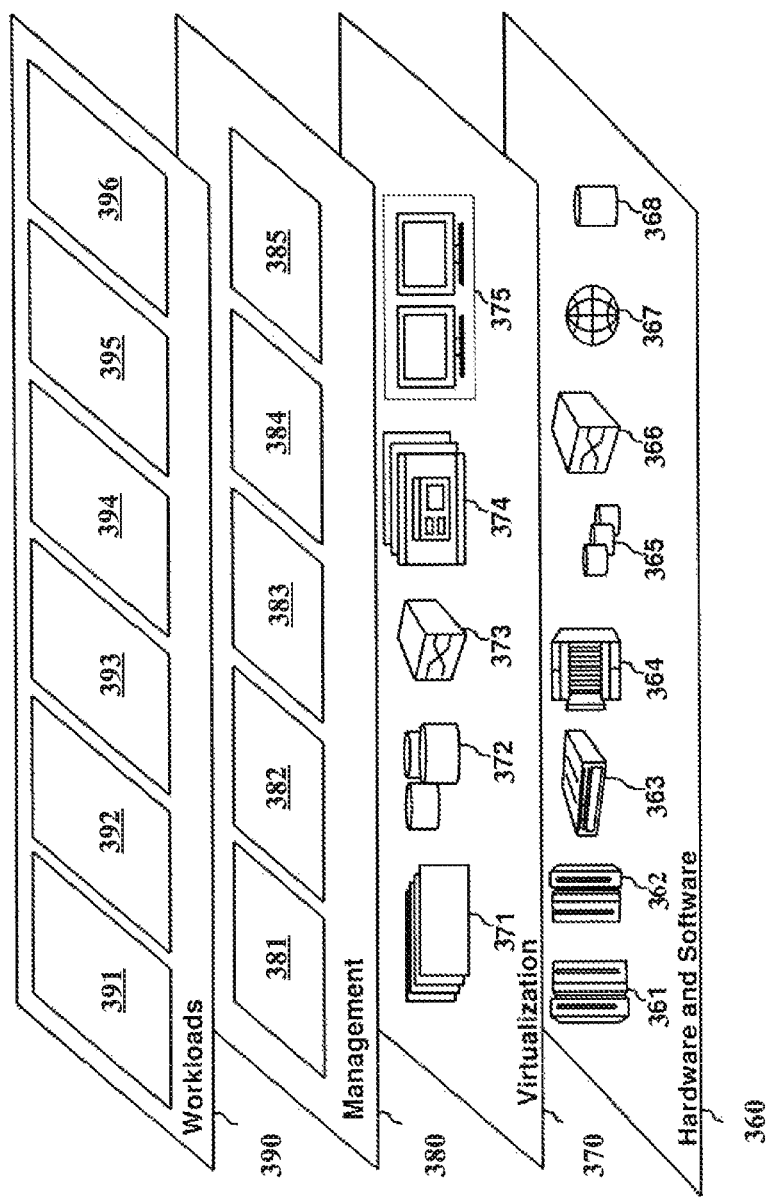
FIG. 3 is a block diagram of a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and reservoir computing 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
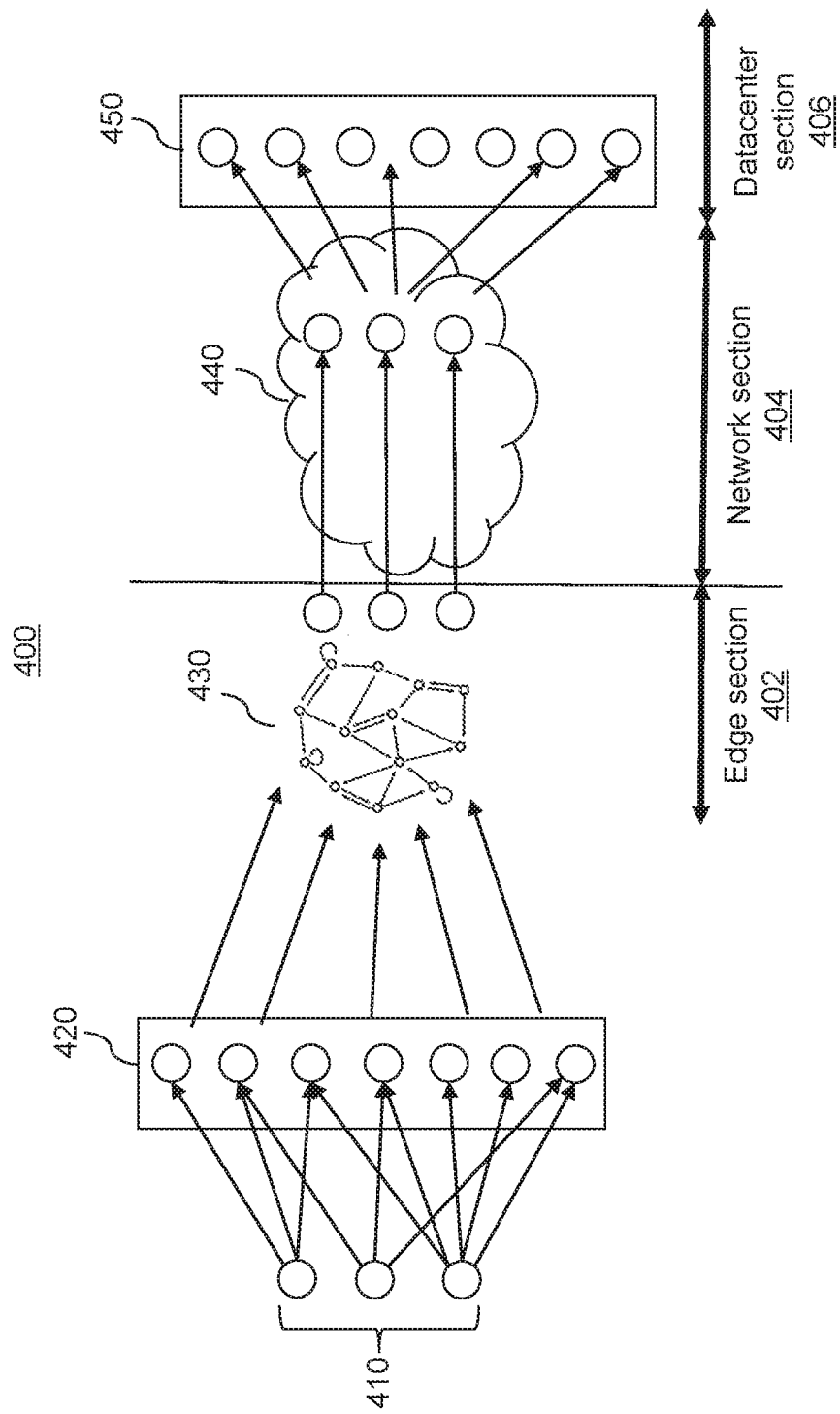
FIG. 4 is a block diagram of a sensor network implementing reservoir computing, in accordance with an embodiment of the present invention.

With reference to FIG. 4, a diagram is provided illustrating a sensor network 400 implementing reservoir computing. In one embodiment, the sensor network 400 includes an IoT system.

The sensor network 400 includes a plurality of sections, including an edge section 402, a network section 404, and a datacenter section 406. The network section 404 can include, e.g., Internet, and the datacenter section 406 can include, e.g., a cloud datacenter.

As shown, hidden data structures 410 provide data to an input layer 420 including a plurality of nodes. The hidden data structures 410 can include low-dimensional hidden data structures. For example, if the edge sensors are located close to each other, there can be significant correlations among the sensor data from them. In such a case, the sensor data can be spatially redundant and the "real" dimension of the sensor data can be relatively low. Therefore, making use of this latent low dimensionality, the sensor data can be compressed before being sent to the datacenter section 406.

The input layer 420 can generate an input signal. The input layer 420 can have a set of input nodes. In one embodiment, generating the time-series data can include each input node of the set of input nodes generating respective data, and aggregating the data generated from each input node into the time-series data. The time-series data can include sensor data obtained from edge sensors of a sensor network (e.g., IoT system). The time-series data can include a high-dimensional input signal, but can have a "real" dimension that is lower due to spatial redundancy. Further details regarding the input layer 420 are described below with reference to FIGS. 5 and 6.

The input signal is fed into a reservoir layer 430 placed at an edge location of the edge section 402, and can be operated near a sensor device of the sensor network 400. Randomized weights W can be defined between the input layer 420 and the reservoir layer 430.

The reservoir layer 430 can have a set of reservoir nodes for performing edge computing by compressing time-series data by reducing the dimensionality of the input signal using a random projection method. The compression can reduce spatial redundancy and preserve a structure of the input signal. For example, the reservoir layer 430 can employ an input mask defined by a combination of random projection matrices to reduce the dimensionality of the input signal. The input mask can have a vertical dimension that is smaller than the horizontal dimension, thereby reducing the dimension of the input signal data.

The reservoir layer 430 can include a nonlinear node with delayed feedback. In this embodiment, the reservoir layer 430 can further include a set of virtual nodes or neurons on a feedback loop. The reservoir layer 430 can be implemented by a non-linear physical system (e.g., a physical reservoir) to enable high-speed and low power operation. Further details regarding the reservoir layer 430 are described below with reference to FIGS. 5 and 6.

Figure 7:
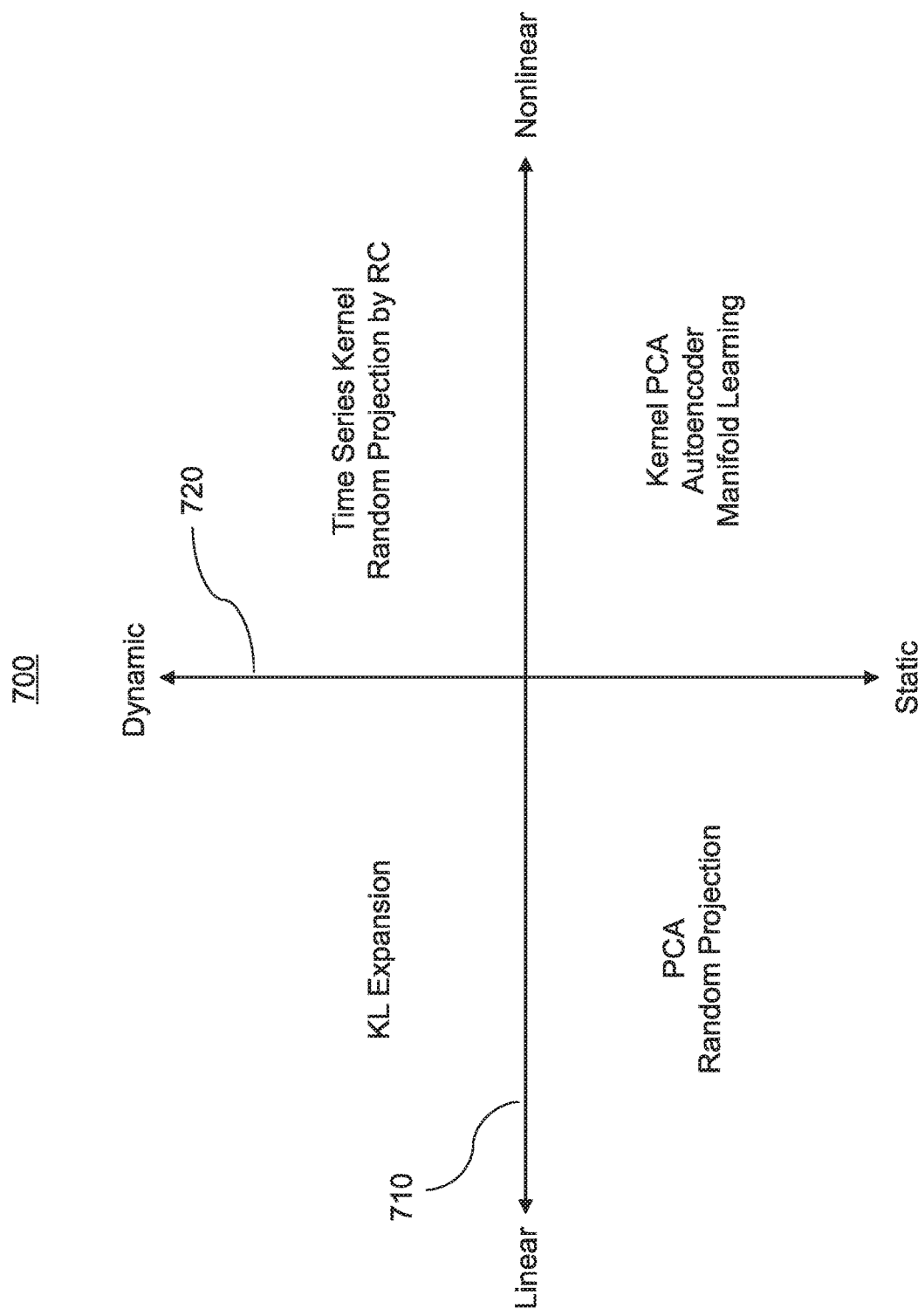
FIG. 7 is an exemplary graph of dimension reduction methods arranged based on dynamics and linearity.

Dimension reduction methods can be classified by linearity (e.g., linear or non-linear), and dynamics (e.g., static or dynamic). With reference to FIG. 7, a graph 700 is provided illustrating a technology mapping of dimensionality reduction. Axis 710 of the graph 700 represents linearity from linear to non-linear, and axis 720 of the graph 700 represents dynamics from static to dynamic.

As shown, a plurality of dimension reduction methods are mapped within the graph 700. The first quadrant of the graph 700, representing dynamic and nonlinear dimension reduction methods, includes Time Series Kernel and Random Projection by reservoir computing (RC). Random Projection by RC is the random projection method used to compress the time-series data in accordance with the embodiments described herein. The second quadrant of the graph 700, representing dynamic and linear dimension reduction methods, includes including Karhunen-Loève (KL) expansion. The third quadrant of the graph 700, representing static and linear dimension reduction methods, includes Principal Component Analysis (PCA) and Random Projection (e.g., Random Projection not by RC in accordance with the embodiments described herein). The fourth quadrant of the graph 700, representing nonlinear and static dimension reduction methods, includes Kernel PCA, Autoencoder and Manifold Learning. Accordingly, compared to Random Projection not by RC in accordance with the embodiments described herein, which is characterized as linear and static, random projection by RC performed in accordance with the embodiments described herein can be characterized as dynamic (e.g., the input data includes time-series data), non-linear (e.g., the model is based on a non-linear RNN).

Referring back to FIG. 4, the compressed data generated by the reservoir layer 430 is transmitted from the edge section 402 to a network 440 (e.g., Internet) of the network section 404, which provides an output signal to an output layer (e.g., readout layer) 450 placed a datacenter location of the datacenter section 406 to perform reconstruction of the signal, thereby enhancing speed and power operation of the sensor network 400. For example, the output layer 450 can read the reservoir state and map the reservoir state to the desired output. The placement of the reservoir layer 430 and the output layer 450 can be determined based on the separation of the reservoir layer 430 and the output layer 450. The output layer 450 can be implemented as an adaptive filter, which can be inexpensive and can reduce power consumption. Further details regarding the transmission of the output signal to the output layer 450 to perform reconstruction of the signal are described below with reference to FIGS. 5 and 6.

Figure 5:
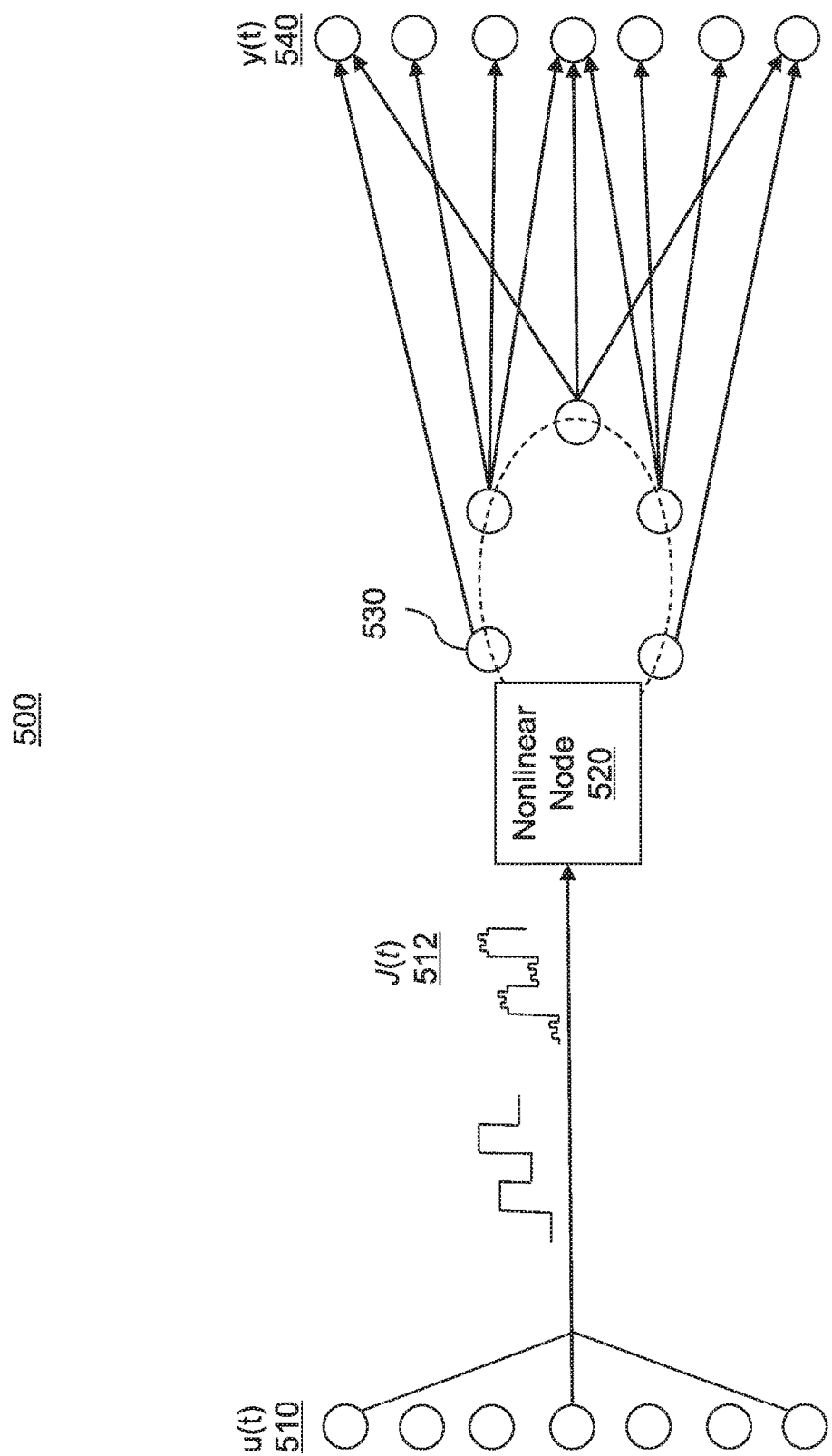
FIG. 5 is a diagram of an implementation of dimensionality reduction by a non-linear system, in accordance with an embodiment of the present invention.

With reference to FIG. 5, a diagram is provided illustrating an example of a reservoir computing system 500 implementing dimensionality reduction by a non-linear system. In this illustrative example, the reservoir computing includes a reservoir layer implemented as a delay system.

As shown, an input stream 510 from an input layer is obtained. The input stream 510 can be a time-varying scalar variable or vector. In this embodiment, the input stream 510 is shown as a time-continuous input stream u(t). However, in another embodiment, the input stream can be a time-discrete input stream u(k).

The input stream 510 can be processed to generate a temporal input stream 512. For example, processing the input stream 510 can include sampling and holding the input stream 510 for a duration τ (where τ is the delay in the feedback loop) to obtain an intermediate stream I(t) that is constant during one delay interval τ before being updated. The intermediate stream can then be multiplied by an input mask $W_{in}$ (e.g., as described above with reference to FIG. 4 and described in further detail below with reference to FIG. 6) to generate the temporal input stream 512 (e.g., J(t)). The temporal input stream 512 can be added to the delayed state of the reservoir layer x (t−τ).

As shown, the reservoir layer includes a nonlinear node 520 and a plurality of virtual nodes or neurons 530. The plurality of virtual neurons 530 are obtained by dividing a delay loop into N equidistant points within a delay interval of length τ. The separation time between each of the virtual neurons 530, which can be defined as τ/N, can be adjusted for performance optimization.

The temporal input stream 512 is input into nonlinear node 520. The response of the nonlinear node 520 can be represented by a function x(t). The function x(t) can represent the state of a nonlinear oscillator at a time t (e.g., voltage output in an implementation by an analog electrical circuit). The nonlinear node 520 can be driven by, e.g., x (t−τ)+γJ(t), where γ is an adjustable parameter. Accordingly, the evolution of the delayed feedback reservoir computing system can be represented by the following differential equation:

$$\frac{dx(t)}{dt} = F(x(t), x(t-\tau) + \gamma J(t)),$$

where F( ) describes a dynamical system.

The virtual neurons 530 can be constructed by sampling x(t) in a time domain with time interval τ/N. The state of the reservoir given the i-th virtual neuron at time t can be represented as $$x\left(t - \frac{\tau}{N}(N-i)\right),$$

with each state characterizing the transient response of the reservoir layer with respect to a given input at a given time. After the interval τ, the states of the virtual neurons 530 can be updated to obtain a state of the reservoir layer.

An output stream 540 (e.g., y(t)) is generated based on the plurality of virtual neurons. The output stream 540 can include values mapped from each value of the input stream 510. More specifically, the output stream 540 can be generated as a weighted sum of the states of the reservoir over each of the virtual neurons. For example, the outputs can be represented as:

$$\sum_{i=1}^{N} w_i x\left(t - \frac{\tau}{N}(N-i)\right).$$

For the reservoir layer to work for dimensionality reduction, the dynamics of the reservoir layer can have a separation property so that the reservoir layer is dynamic and that significant difference of the input must remain indistinguishable over time after being mapped to reservoir states. In addition, the reservoir layer can have a fading memory property, meaning that the reservoir layer is stable enough to eventually forget the effect of past input and be driven only by recent input. Without fading memory, the reservoir layer can have highly sensitive dynamics (e.g., chaotic motion), and can enhance even minor differences of input. The separation and fading memory properties can be in conflict, and thus a trade-off may be needed between them.

Figure 6:
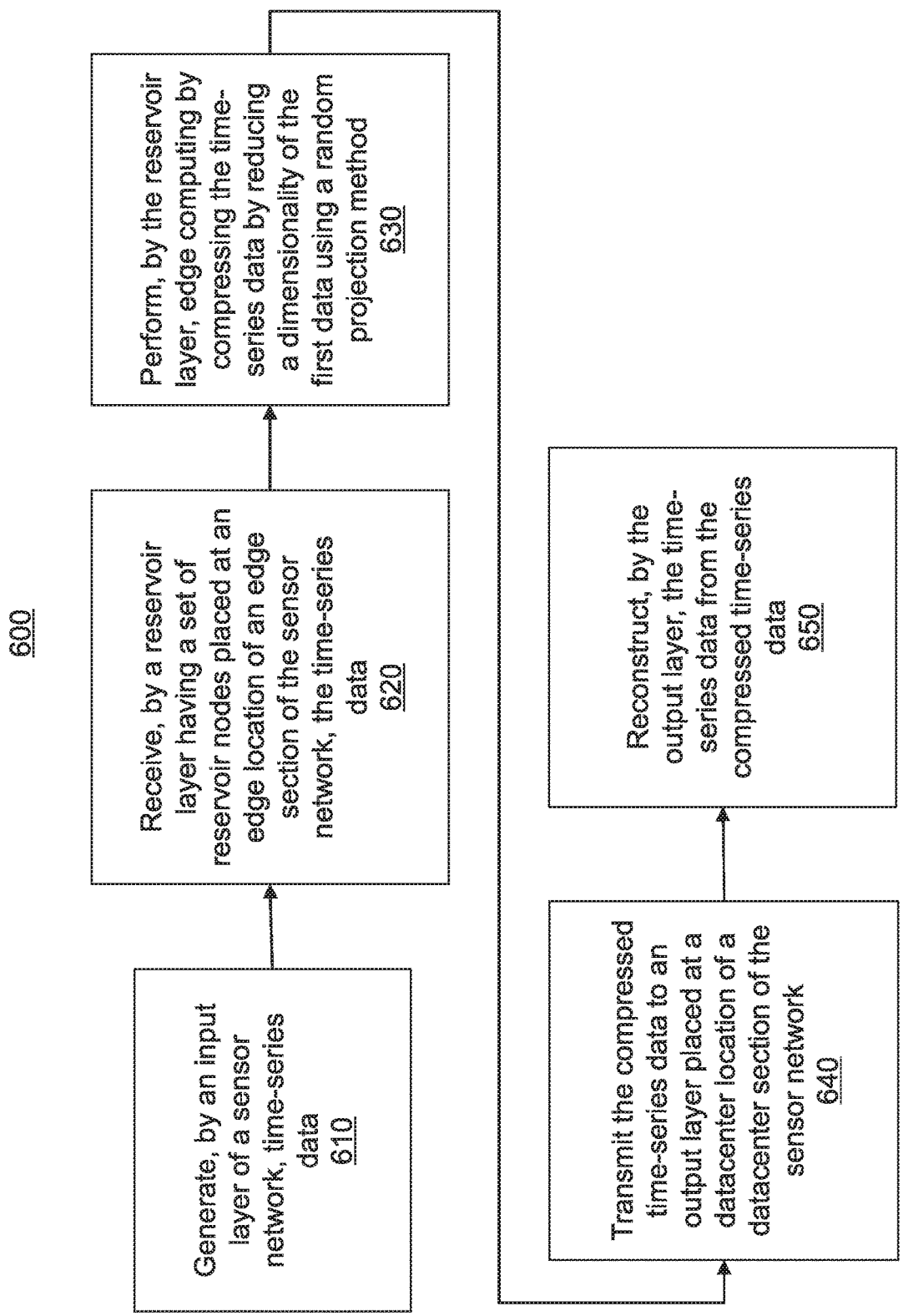
FIG. 6 is a block/flow diagram of a system/method for enhancing speed and power operation of a sensor network, in accordance with an embodiment of the present invention.

With reference to FIG. 6, a block/flow diagram is provided illustrating a system/method 400 for enhancing speed and power operation of a sensor network. For example, the system/method 400 can enable high speed and lower power operation of a sensor network.

At block 610, time-series data is generated by an input layer of a sensor network. The input layer can have a set of input nodes. In one embodiment, generating the time-series data can include each input node of the set of input nodes generating respective data, and aggregating the data generated from each input node into the time-series data. The time-series data can include sensor data obtained from edge sensors of a sensor network (e.g., IoT system). The time-series data can include a high-dimensional input signal, but can have a "real" dimension that is lower due to spatial redundancy.

At block 620, the time-series data is received by a reservoir layer having a set of reservoir nodes placed at an edge location of an edge section of the sensor network. For example, a signal receiver embedded within the reservoir layer can receive the time-series data from the input layer. In one embodiment, randomized weights between the input layer and the reservoir layer, and randomized internal weights between the plurality of nodes of the reservoir layer, can be defined.

At block 630, the reservoir layer performs edge computing by compressing the time-series by reducing a dimensionality of the time-series data using a random projection method. The compression can reduce spatial redundancy and preserve a structure of the time-series data. The dimensionality reduction can identify a lower-dimensional structure in the first data, which can be used to perform analytics (e.g., feature selection for classification and visualization), and save communication and storage resources. To handle the dynamics of the time-series data, the reservoir layer can have a smaller dimension than that of the input layer (e.g., the set of reservoir nodes can have a smaller dimension than the set of input nodes). As described above with reference to FIGS. 4 and 5, dimensionality reduction using random projection in accordance with the embodiments described herein is nonlinear and dynamic, as compared to other random projection methods. As further described above with reference to FIGS. 4 and 5, the reservoir layer can include a nonlinear node with delayed feedback. In this embodiment, the reservoir layer can further include a set of virtual nodes or neurons on a feedback loop. The reservoir layer can be implemented by a non-linear physical system (e.g., a physical reservoir) to enable high-speed and low power operation.

In one embodiment, reducing the dimensionality of the time-series data can include implementing the set of reservoir nodes with an input mask defined by a combination of random projection matrices. The input mask can be defined by a specific type of random projection matrices to ensure the preservation of the structure of the original time-series data. The input mask can have a vertical dimension that is smaller than the horizontal dimension, thereby reducing the dimension of the time-series data.

An example of a combination of random projection matrices $W_{in}=W_{i,j}$ defining the input mask that can be applied to the first data to generate the second data is provided as follows:

$$W_{i,j} = \begin{cases} +\sqrt{3} & \text{with probability } \frac{1}{6} \\ 0 & \text{with probability } \frac{2}{3} \\ -\sqrt{3} & \text{with probability } \frac{1}{6} \end{cases}$$

That is, ⅔ of the matrix values are 0, ⅙ of the matrix values are $\sqrt{3}$ and ⅙ of the matrix values are $-\sqrt{3}$. As another example, the input mask weight can be defined by generating random orthogonal unit vectors $u_1, \ldots u_n$ and $v_1, \ldots v_m$, wherein $W=u_1v_1^T+u_nv_n^T$, (n<m). It is to be understood that these input mask examples are purely exemplary, and any suitable input mask can be used to perform dimensionality reduction in accordance with the embodiments described herein.

At block 640, the compressed time-series data is transmitted to an output layer (e.g., a readout layer) placed at a datacenter of a datacenter section of the sensor network. In one embodiment, the datacenter includes a cloud datacenter. The output layer has a set of output nodes.

At block 650, the time-series data is reconstructed from the compressed time-series data by the output layer. In one embodiment, adjustable interconnection weights can be defined for a linear filter of the output layer, and applied to the second data to reconstruct the first data.

As described above, the reservoir layer can be placed at an edge of a sensor network (e.g., an IoT system), and the output layer can be placed at a datacenter (e.g., a cloud datacenter) of the sensor network. The placement of the reservoir layer and the output layer can be determined based on the separation of the reservoir layer and the output layer.

Further details regarding this exemplary sensor network system implementation of the reservoir computing system/method are described above with reference to FIGS. 4-5.

Having described preferred embodiments of systems and methods of enabling high speed and lower power operation of a sensor network using reservoir computing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for enhancing speed and power operation of a sensor network, comprising:
at least one hardware processor device operatively coupled to memory and configured to implement:
an input layer configured to generate time-series data associated with one or more Internet of Things (IoT) sensors of an IoT system of the sensor network by aggregating data generated by respective nodes of a set of the plurality of input nodes;
a reservoir layer having a smaller dimension than the input layer placed at an edge location, the reservoir layer having a set of a plurality of reservoir nodes for performing edge computing by compressing the time-series data received from the input layer by reducing a dimensionality of the time-series data using a random projection method implementing an input mask defined by a combination of random projection matrices, wherein the compression of the time-series data reduces spatial redundancy and preserves a structure of the time-series data, wherein the reservoir layer is implemented by a non-linear system including a delayed feedback system having a set of virtual neurons on a feedback loop;
wherein the input layer is further configured to define randomized weights between the input layer and the reservoir layer, and the reservoir layer is further configured to define randomized internal weights between nodes of the set of reservoir nodes; and
an output layer placed at a datacenter location, the output layer further having a set of a plurality of output nodes connected to the set of reservoir nodes for reconstructing the time-series data from the compressed time-series data, thereby enhancing speed and power operation of the sensor network, wherein the output layer further includes a linear filter configured to receive the compressed time-series data, and wherein adjustable interconnection weights for the linear filter are defined based on the compressed time-series data.

2. The system of claim 1, further comprising a signal receiver embedded within the reservoir layer configured to receive the time-series data from the input layer.

3. A computer-implemented method for enhancing speed and power operation of a sensor network, comprising:
receiving, by a reservoir layer having a set of a plurality of reservoir nodes placed at an edge location, time-series data associated with one or more Internet of Things (IoT) sensors of an IoT system of the sensor network generated by an input layer, the reservoir layer having a smaller dimension than the input layer, wherein the input layer is configured to generate the time-series data by aggregating data generated by respective nodes of a plurality of input nodes, and wherein the reservoir layer is implemented by a non-linear system including a delayed feedback system having a set of virtual neurons on a feedback loop;
performing, by the reservoir layer, edge computing, including compressing the time-series data by reducing a dimensionality of the time-series data using a random projection method implementing an input mask defined by a combination of random projection matrices, wherein the compression of the time-series data reduces spatial redundancy and preserves a structure of the time-series data;
transmitting, by the reservoir layer to a linear filter of an output layer having a set of a plurality of output nodes placed at a datacenter location, the compressed time-series for reconstructing the time-series data, thereby enhancing speed and power operation of the sensor network; and defining, by the reservoir layer, randomized internal weights between nodes of the set of the plurality of reservoir nodes, wherein randomized weights between the input layer and the reservoir layer are defined, and wherein adjustable interconnection weights are defined for the linear filter based on the compressed time-series data.

4. The method of claim 3, wherein the time-series data is received from the input layer by a signal receiver embedded within the reservoir layer.

5. A computer program product comprising a non-transitory computer readable storage medium having program instructions embodied therewith, the program instructions executable by a computer to cause the computer to perform a method for enhancing speed and power operation of a sensor network, the method performed by the computer comprising:

receiving, by a reservoir layer having a set of a plurality of reservoir nodes placed at an edge location, time-series data associated with one or more Internet of Things (IoT) sensors of an IoT system of the sensor network generated by an input layer, the reservoir layer having a smaller dimension than the input layer, wherein the input layer is configured to generate the time-series data by aggregating data generated by respective nodes of a plurality of input nodes, and wherein the reservoir layer is implemented by a non-linear system including a delayed feedback system having a set of virtual neurons on a feedback loop;

performing, by the reservoir layer, edge computing, including compressing the time-series data by reducing a dimensionality of the time-series data using a random projection method implementing an input mask defined by a combination of random projection matrices, wherein the compression of the time-series data reduces spatial redundancy and preserves a structure of the time-series data;

transmitting, by the reservoir layer to a linear filter of an output layer having a set of a plurality of output nodes placed at a datacenter location, the compressed time-series for reconstructing the time-series data, thereby enhancing speed and power operation of the sensor network; and defining, by the reservoir layer, randomized internal weights between nodes of the set of the plurality of reservoir nodes, wherein randomized weights between the input layer and the reservoir layer are defined, and wherein adjustable interconnection weights are defined for the linear filter based on the compressed time-series data.

6. The computer program product of claim 5, wherein the time-series data is received from the input layer by a signal receiver embedded within the reservoir layer.

* * * * *